US012638041B2

(12) United States Patent
Debroucke et al.

(10) Patent No.: US 12,638,041 B2
(45) Date of Patent: May 26, 2026

(54) MECHANICAL CONTROL DEVICE WITH IMPROVED CONTROL CABLE COUPLING

(71) Applicant: Minebea AccessSolutions France, Alfortville (FR)

(72) Inventors: François Debroucke, Alfortville (FR); Corentin Boutoille, Alfortville (FR); Laurent Duriez, Alfortville (FR)

(73) Assignee: Minebea AccessSolutions France, Alfortville (FR)

( * ) Notice: Subject to any disclaimer, the term of this patent is extended or adjusted under 35 U.S.C. 154(b) by 0 days.

(21) Appl. No.: 18/778,215

(22) Filed: Jul. 19, 2024

(65) Prior Publication Data

US 2025/0027529 A1      Jan. 23, 2025

(30) Foreign Application Priority Data

Jul. 21, 2023      (EP) ..................................... 23315286

(51) Int. Cl.
  *F16C 1/14*          (2006.01)
  *E05B 79/20*         (2014.01)
(52) U.S. Cl.
  CPC .............. *F16C 1/145* (2013.01); *E05B 79/20* (2013.01)
(58) Field of Classification Search
  CPC .. F16C 1/145; F16C 1/14; F16C 1/262; F16G 11/106
  See application file for complete search history.

(56) References Cited

U.S. PATENT DOCUMENTS

| | | | |
|---|---|---|---|
| 4,847,973 A * | 7/1989 | Lundeen ................... | F16C 1/14 |
| | | | 74/502.6 |
| 4,961,354 A | 10/1990 | Yoshigai | |
| 5,062,315 A | 11/1991 | Yoshigai | |
| 5,237,889 A * | 8/1993 | Conrad ................... | F02D 11/04 |
| | | | 403/325 |
| 5,493,934 A * | 2/1996 | Kelley ..................... | F16C 1/14 |
| | | | 403/209 |
| 2017/0314677 A1* | 11/2017 | DeVos .................... | F16H 61/36 |
| 2023/0366427 A1* | 11/2023 | Tokimasa ................ | F16C 1/106 |

FOREIGN PATENT DOCUMENTS

| | | | | |
|---|---|---|---|---|
| DE | 19835949 A1 * | 2/2000 | ......... | B60H 1/00578 |
| FR | 1257710 A * | 4/1961 | | |
| JP | h04297684 a * | 10/1992 | | |

* cited by examiner

*Primary Examiner* — Daniel D Yabut
(74) *Attorney, Agent, or Firm* — Oblon, McClelland, Maier & Neustadt, L.L.P.

(57)      ABSTRACT

A mechanical control device includes a control cable coupled to a lever, and a coupling element secured to one end of the cable, the coupling element including two pivoting ends movably mounted respectively on two flanges of the lever about a pivot axis. The cable coupling end is interposed axially between the two pivoting ends of the coupling element. The coupling element incudes a radial protrusion for limiting axial movements of the coupling element between the flanges. The radial protrusion extends between the flanges and has an axial dimension greater than a diameter of the cable maintaining, during the axial movements of the coupling element between the flanges, a clearance between the cable and each of the lever flanges.

10 Claims, 3 Drawing Sheets

MECHANICAL CONTROL DEVICE WITH IMPROVED CONTROL CABLE COUPLING

BACKGROUND OF THE INVENTION

Field of the Invention

The present invention relates to a mechanical control device with improved control cable coupling.

Description of the Related Art

It applies in particular to a control device for an automotive vehicle door latch.

Usually, a motor vehicle door latch, for example an access door latch to the passenger compartment of the vehicle, is controlled in particular by a chain of mechanical means connecting a control handle, external or internal to the passenger compartment, and the latch.

It is already known in the state of the art a mechanical cable control device, for example of the Bowden type, integrated into the chain of mechanical means connecting the control handle and the latch. The control cable is intended to actuate or to be actuated by a lever (22) forming part of the latch or of the chain of mechanical means connecting the control handle and the latch. The control cable carries a coupling element secured to one end of the cable, referred to as the coupling end of the cable. This coupling element has two pivoting ends mounted so that they can move respectively on two flanges of the lever (22) about a pivoting axis. The cable coupling end is interposed axially between the two pivoting ends of the coupling element.

When the chain of mechanical means connecting the control handle and the latch is actuated, the movements of the various elements of the chain, in particular the movements of the control cable, tend to cause axial movements of the cable coupling element between the flanges of the lever. These axial movements tend to bring the control cable into contact with one or other of the flanges and therefore create friction between the cable and the flanges, causing wear to the cable.

BRIEF SUMMARY OF THE INVENTION

The aim of the invention is in particular to limit, or even avoid, the friction of the cable against the flanges of the lever during the actuation of the chain of mechanical means connecting the control handle and the latch.

To that end, the invention relates to a mechanical control device comprising:

- a control cable coupled to a lever, in order to actuate or to be actuated by the lever,
- a coupling element secured to one end of the cable, referred to as the coupling end of the cable, this coupling element comprising two pivoting ends movably mounted respectively on two flanges of the lever about a pivoting axis, the cable coupling end being interposed axially between the two pivoting ends of the coupling element, characterized in that the coupling element comprises a radial protrusion for limiting axial movements of the coupling element between the flanges, this radial protrusion extending between the flanges and having an axial dimension greater than the diameter of the cable so as to maintain, during axial movements of the coupling element between the flanges, a clearance between the cable and each of the lever flanges preventing contact of the cable with each of the flanges.

Thus, the radial protrusion for limiting axial movement of the coupling element makes it possible, when the control cable is actuated and moves, to maintain a clearance between the cable and each of the flanges of the lever which prevents contact of the cable with each of the flanges. This avoids, or at least limits, the risk of the control cable rubbing against the flanges of the lever. The life of the cable control device is thus optimized.

Other optional features of the invention, which may be taken separately or in combination, are recited below.

The cable coupling end and the radial protrusion for limiting axial movements are angularly offset from each other with respect to the pivot axis of the pivoting ends of the coupling element. The zone of the coupling element which is close to the coupling end of the cable is sensitive to wear. The angular offset between the cable coupling end and the radial protrusion makes it possible to distance this protrusion from this wear zone.

The radial protrusion for limiting axial movements forms a quarter-turn mounting protrusion of the coupling element on the flanges, the coupling element being mounted on the flanges by displacement of this coupling element parallel to the pivot axis of the coupling element through an access orifice formed in one of the flanges, referred to as an access flange, the access orifice having a contour comprising a part which is complementary to the contour of the radial protrusion and an interruption forming a passage for the cable when the coupling element is moved through the access orifice.

The cable coupling end and the radial protrusion for limiting axial movements have a common plane of symmetry perpendicular to the pivot axis of the coupling element.

Furthermore, the cable coupling end has a first plane of symmetry comprising the pivot axis of the coupling element, and the radial protrusion for limiting axial movements has a second plane of symmetry comprising the pivot axis of the coupling element, the first and second planes of symmetry containing the pivot axis of the coupling element being perpendicular to each other.

These different symmetries enable the control cable to be mounted both on a first lever and on a similar second lever derived from the first lever by chiral symmetry.

Preferably, the axial dimension of the radial protrusion is between $1.35 \times D$ and $2 \times D$, D being the diameter of the control cable.

Preferably, the axial spacing between the two flanges is between $1.95 \times D$ and $2.05 \times D$, where D is the diameter of the control cable.

The radial protrusion for limiting axial movements is integral with the two pivoting ends of the coupling element.

The radial protrusion for limiting axial movements is formed from a material selected from a polymer and a metallic material, for example an alloy based on zinc, aluminium, magnesium and copper.

The invention also relates to a control device for a motor vehicle door latch comprising a mechanical control device as defined above.

BRIEF DESCRIPTION OF THE FIGURES

The invention will be better understood on reading the following description, which is given by way of example only and with reference to the attached drawings in which.

DETAILED DESCRIPTION

Figure 1:
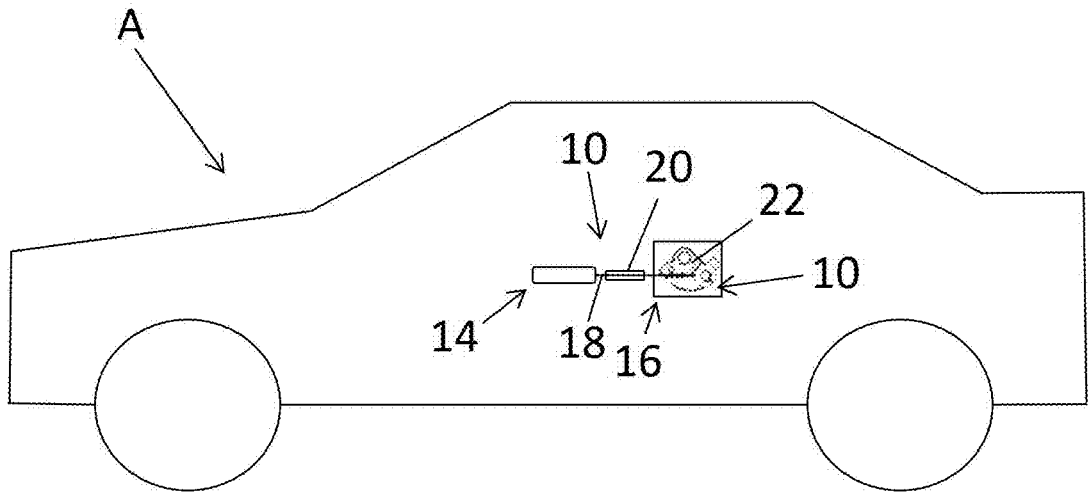
FIG. 1 is a schematic view of an automotive vehicle comprising a device for controlling an opening door latch according to the invention.

There is shown in FIG. 1 an automotive vehicle A comprising a device according to the invention, designated by the general reference 10, for controlling a latch 12 on a door of this vehicle.

The device 10 for controlling the latch 12 comprises a chain of mechanical means connecting a control handle 14, for example external to a passenger compartment of the vehicle, and the latch 12. Alternatively, the control handle 14 could be internal to the vehicle passenger compartment.

One of the mechanical means connecting the latch 12 and the control handle 14 is formed by a mechanical control device 16 according to the invention. This mechanical control device 16 comprises a control cable 18, for example of the Bowden type, slidably mounted in a sheath 20.

The mechanical control device 16 also comprises a lever 22 forming part of the lock 12 or of the chain of mechanical means connecting the control handle 14 and the lock 12. The control cable 18 is intended to actuate the lever 22.

The control cable 18 and the lever 22 are shown in more detail in FIGS. 2 to 6.

Figure 2:
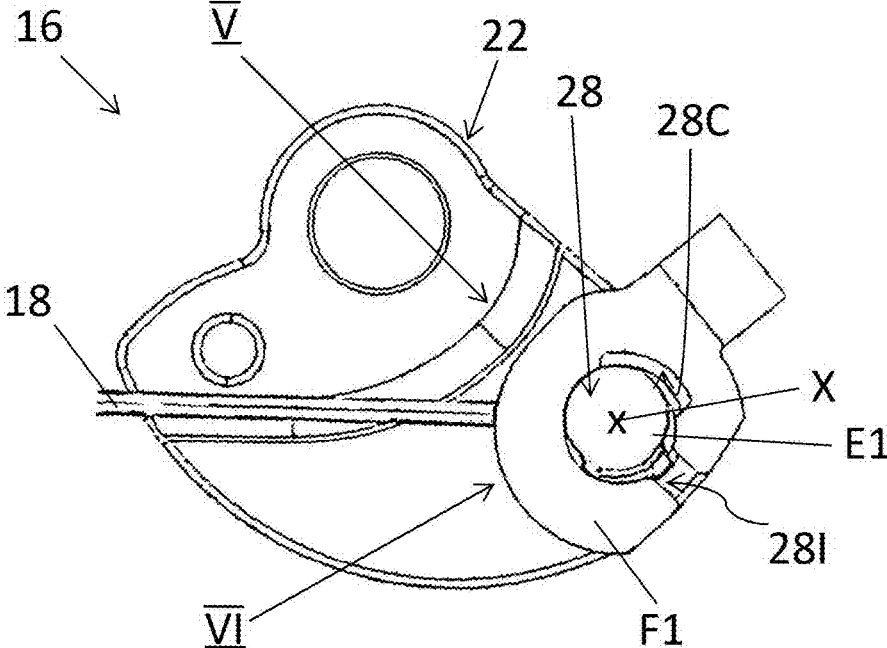
FIG. 2 is a front view of a mechanical control device according to the invention integrated into the latch control device of FIG. 1.
Figure 3:
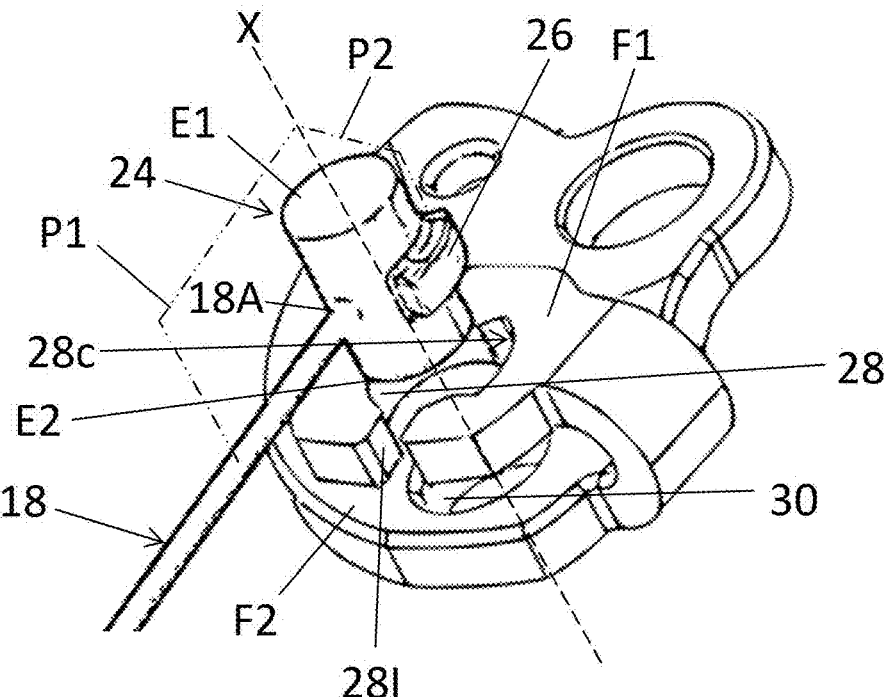
FIG. 3 is a perspective view of the mechanical control device shown in FIG. 2 during an assembly step.
Figure 4:
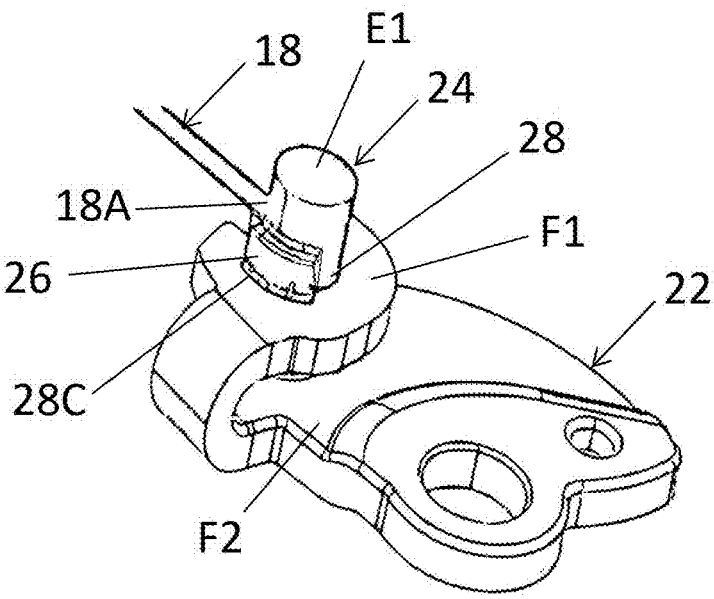
FIG. 4 is a perspective view, from a point of view other than that of FIG. 3, of the mechanical control device shown in FIG. 2 during another assembly step.

Referring to FIGS. 2 to 4, it can be seen that the mechanical control device 16 further comprises a coupling element 24 secured to one end of the cable 18, referred to as the coupling end 18A of the cable 18.

As can be seen in FIG. 3, the coupling element 24 comprises first E1 and second E2 pivoting ends movably mounted respectively on first F1 and second F2 flanges of the lever 22 around a pivot axis X.

It will be noted that the coupling end 18A of the cable is interposed axially between the two pivoting ends E1, E2 of the coupling element 24.

As can be seen in FIG. 3, the coupling element 24 further comprises a radial protrusion 26 intended to limit axial movement of the coupling element 24 between the flanges F1, F2.

Figure 5:
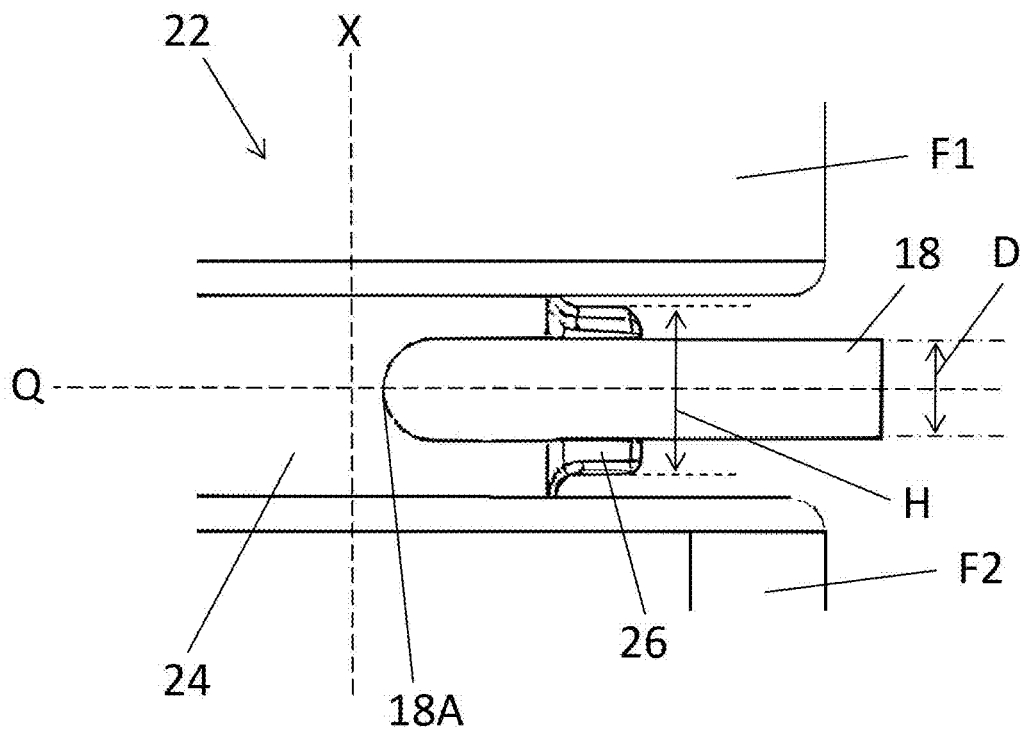
FIG. 5 is a side view along the arrow V of FIG. 2 of the mechanical control device shown in this FIG. 2.
Figure 6:
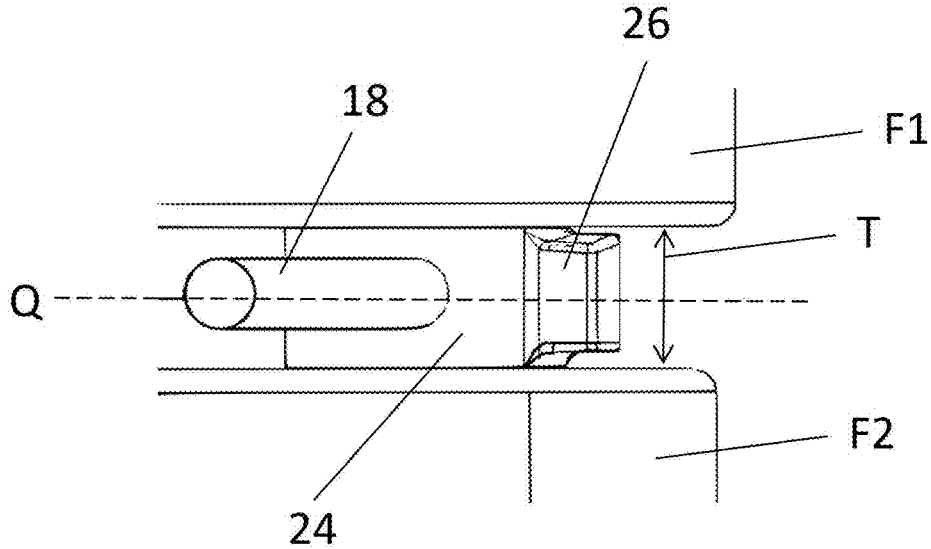
FIG. 6 is a side view along the arrow VI of FIG. 2 of the mechanical control device shown in this FIG. 2.

As can be seen in FIGS. 2, 5 and 6, after assembly of the coupling element 24 on the flanges F1, F2 of the lever 22, the radial protrusion 26 extends axially between the flanges F1, F2.

As can be seen more particularly in FIGS. 5 and 6, the radial protrusion 26 has an axial dimension greater than the diameter D of the cable 18 so as to maintain, during axial movements of the coupling element 24 between the flanges F1, F2, a clearance between the cable 18 and each of the flanges F1, F2 of the lever 22 preventing contact of the cable 18 with each of the flanges F1, F2.

The control cable 18 is made of a conventional material, for example braided metal wires.

In the example shown in the Figures, the radial protrusion 26 is integral with the two pivoting ends E1, E2 of the coupling element 24. Furthermore, in the example shown, the coupling element 24 and the radial protrusion 26 are formed from a metal alloy based on zinc, aluminium, magnesium and copper, also known as Zamak. Alternatively, the coupling element 24 and the radial protrusion 26 could be formed from another metallic material or from a polymer.

According to another example not illustrated, the radial protrusion 26 could be attached to the coupling element 24 by being fixed to this coupling element by embedding or by a suitable fixing means. In this case, the coupling element 24 and the radial projection 26 could be formed in different materials, in particular chosen from a polymer and a metallic material, for example Zamak.

The coupling end 18A of the cable is secured to the coupling element 24 in a manner known per se, for example by molding the coupling element 24 around the coupling end 18A. Preferably, as can be seen in particular in FIGS. 3 and 6, the coupling end 18A of the cable and the radial protrusion 26 are angularly offset from each other with respect to the pivot axis X. Indeed, the zone of the coupling element 24 which is close to the coupling end 18A of the cable, which is flexible, is sensitive to wear. The angular offset between the cable coupling end 18A and the radial protrusion 26 makes it possible to distance this protrusion 26 from this wear zone.

Preferably, as in the example described, the cable coupling end 18A has a first plane of symmetry P1 containing the pivot axis X and the radial protrusion 26 has a second plane of symmetry P2 containing the pivot axis X. As can be seen in FIG. 3, the first P1 and second P2 planes of symmetry are perpendicular to each other.

Also, preferably, as can be seen in particular in FIGS. 5 and 6, the cable coupling end 18A and the radial protrusion 26 have a common plane of symmetry Q perpendicular to the pivot axis X.

In particular, these different symmetries enable the control cable 18 to be mounted both on a lever 22 such as that shown in FIGS. 2 to 6 and on a similar lever derived from lever 22 by chiral symmetry.

It will be noted, in particular with reference to FIGS. 3 and 4, that the radial protrusion 26 forms a quarter-turn mounting protrusion of the coupling element 24 on the flanges F1, F2.

Indeed, FIGS. 3 and 4 respectively illustrate initial and intermediate steps of mounting the coupling element 24 on the flanges F1, F2.

Thus, as shown in FIGS. 3 and 4, the coupling element 24 is mounted on the flanges F1, F2 by translational movement of this coupling element 24 parallel to the pivot axis X through an access orifice 28 provided in the first flange F1 forming an access flange. This access orifice 28 has a contour comprising a part 28C complementary to the contour of the radial protrusion 26 and an interruption 28I forming a passage for the cable 18 when the coupling element 24 is moved through the access orifice 28.

When the translational movement of the coupling element 24 has been completed, the first E1 and second E2 ends can pivot respectively in the access orifice 28, which then forms a first bearing, and in a second bearing provided in the second flange F2.

Pivoting the coupling element 24 about the axis X axially traps the radial protrusion 26 between the flanges F1, F2, thus coupling the control cable 18 to the lever 22, as shown in FIG. 2.

In order to effectively limit, or even prevent, the risk of the control cable 18 rubbing against the flanges F1, F2 of the lever 22, preferably the axial dimension H of the radial projection 26 is between 1.35×D and 2×D, D being the diameter of the control cable 18 (see FIG. 5).

Also, preferably, the axial spacing T between the two flanges is between 1.95×D and 2.05×D.

The invention is not limited to the embodiment and examples described above. In particular, the cable coupling end 18A and the radial protrusion 26 may not have a common plane of symmetry perpendicular to the pivot axis X. Thus, to take account of a particular configuration of the path of the cable 18, the cable coupling end 18A may have a plane of symmetry perpendicular to the axis X which is axially offset with respect to a plane of symmetry perpendicular to the axis X of the radial projection 26.

Furthermore, the mechanical control device 16 may form a means of any chain of mechanical control means, i.e. not necessarily a chain of mechanical means connecting an automotive vehicle door control handle to a latch. In particular, the mechanical control device 16 can form a means of a chain of mechanical means for controlling a cycle brake or the brake of a light non-automotive vehicle.

Furthermore, the control cable 18 of the mechanical control device according to the invention is not necessarily intended to actuate the lever 22 but could be coupled to a lever in order to be actuated by the lever, specially in the case of a cable of the Bowden type.

LIST OF REFERENCES

10: control device
12: latch
14: control handle
16: mechanical control device
18: control cable
18A: coupling end of the cable
20: sheath
22: lever
24: coupling element
26: radial protrusion
28: access orifice
28C: part complementary to the contour of the radial protrusion
28I: interruption forming a passage for the cable
D: diameter of the cable
E1: first pivoting end of the coupling element
E2: second pivoting end of the coupling element
F1: first flange
F2: second flange
H: axial dimension of the radial protrusion
P1: first plane of symmetry
P2: second plane of symmetry
Q: plane of symmetry perpendicular to the pivot axis
T: axial spacing between the two flanges
X: pivot axis
The invention claimed is:

1. A mechanical control device comprising:
a control cable coupled to a lever, configured to actuate or to be actuated by the lever, and
a coupling element secured to a coupling end of the cable, the coupling element comprising two pivoting ends movably mounted respectively on two flanges of the lever about a pivot axis, the cable coupling end being interposed axially between the two pivoting ends of the coupling element, wherein the coupling element comprises a radial protrusion for limiting axial movements of the coupling element between the flanges, the radial protrusion extending between the flanges and having an axial dimension greater than a diameter of the cable maintaining, during axial movements of the coupling element between the flanges, a clearance between the cable and each of the lever flanges preventing contact of the cable with each of the flanges, and
wherein an access orifice is provided in one of the flanges to allow insertion of the coupling element, and the access orifice includes a contour including a part complementary to a contour of the radial protrusion.
2. The mechanical control device according to claim 1, wherein the cable coupling end and the radial protrusion for limiting the axial movements are angularly offset from each other with respect to the pivot axis of the pivoting ends of the coupling element.
3. The mechanical control device according to claim 1, wherein the radial protrusion for limiting the axial movements forms a quarter-turn mounting protrusion of the coupling element on the flanges, the coupling element being mounted on the flanges by displacement of the coupling element parallel to the pivot axis of the coupling element through the access orifice an interruption forming a passage for the cable when the coupling element is moved through the access orifice.
4. The mechanical control device according to claim 1, wherein the cable coupling end and the radial protrusion for limiting the axial movements have a common plane of symmetry perpendicular to the pivot axis of the coupling element.
5. The mechanical control device according to claim 1, wherein:
the cable coupling end has a first plane of symmetry comprising the pivot axis of the coupling element,
the radial protrusion for limiting the axial movements has a second plane of symmetry comprising the pivot axis of the coupling element, and
the first and second planes of symmetry containing the pivot axis of the coupling element are perpendicular to each other.
6. The mechanical control device according to claim 1, wherein an axial dimension of the radial protrusion is between 1.35×D and 2×D, D being the diameter of the control cable.
7. The mechanical control device according to claim 1, wherein an axial spacing between the two flanges is between 1.95×D and 2.05×D, where D is the diameter of the control cable.
8. The mechanical control device according to claim 1, wherein the radial protrusion for limiting the axial movements is integral with the two pivoting ends of the coupling element.
9. The mechanical control device according to claim 1, wherein the radial protrusion for limiting the axial movements is formed from a material selected from a polymer and a metallic material, including an alloy based on zinc, aluminium, magnesium and copper.
10. A control device for an automotive vehicle door latch comprising the mechanical control device according to claim 1.

* * * * *